(12) United States Patent
Ulug et al.

(10) Patent No.: US 8,762,939 B1
(45) Date of Patent: Jun. 24, 2014

(54) SYSTEM AND METHOD FOR DISPLAYING KEY PERFORMANCE INDICATORS IN AN APPLICATION DESIGN TOOL

(75) Inventors: Amy E. Ulug, San Jose, CA (US); Suresh K. Panganamala, Fremont, CA (US); Stephen R. Springer, Needham, MA (US); Rakesh Ramadas, Fremont, CA (US); William Bridges Smith, Jr., Peterborough, NH (US); Vijay R. Raman, Pleasanton, CA (US); Deepali Pathak, Milpitas, CA (US)

(73) Assignee: Nuance Communications, Inc., Burlington, MA (US)

( * ) Notice: Subject to any disclaimer, the term of this patent is extended or adjusted under 35 U.S.C. 154(b) by 431 days.

(21) Appl. No.: 12/803,742

(22) Filed: Jul. 2, 2010

(51) Int. Cl.
  *G06F 9/44* (2006.01)
  *G06F 9/445* (2006.01)
  *G06F 3/04842* (2013.01)
  *G06F 3/0484* (2013.01)

(52) U.S. Cl.
  CPC *G06F 9/445* (2013.01); *G06F 9/44* (2013.01); G06F 3/04842 (2013.01)
  USPC ............ 717/109; 717/105; 717/113; 717/125

(58) Field of Classification Search
  CPC ........ G06F 9/44; G06F 9/445; G06F 3/04842
  USPC .......................... 717/100, 109, 105, 113, 125
  See application file for complete search history.

(56) References Cited

U.S. PATENT DOCUMENTS

| | | | |
|---|---|---|---|
| 4,697,282 A | 9/1987 | Winter et al. | |
| 4,918,322 A | 4/1990 | Winter et al. | |
| 5,740,233 A | 4/1998 | Cave et al. | |
| 6,192,108 B1 | 2/2001 | Mumford et al. | |
| 6,243,680 B1 | 6/2001 | Gupta et al. | |
| 6,246,982 B1 | 6/2001 | Beigi et al. | |
| 6,380,937 B1 | 4/2002 | Dong et al. | |
| 6,493,703 B1 | 12/2002 | Knight et al. | |
| 6,778,982 B1 | 8/2004 | Knight et al. | |
| 6,842,504 B2 | 1/2005 | Mills et al. | |
| 6,868,525 B1 | 3/2005 | Szabo | |
| 6,907,118 B2 | 6/2005 | Henderson et al. | |
| 6,934,935 B1 * | 8/2005 | Bennett et al. | 717/127 |
| 7,023,979 B1 | 4/2006 | Wu et al. | |
| 7,039,166 B1 | 5/2006 | Peterson et al. | |
| 7,047,486 B1 | 5/2006 | Nagao | |
| 7,106,851 B2 | 9/2006 | Tang et al. | |
| 7,353,016 B2 | 4/2008 | Roundtree et al. | |
| 7,360,151 B1 | 4/2008 | Froloff | |

(Continued)

Primary Examiner — Chat C. Do
Assistant Examiner — Lynda Dinh
(74) Attorney, Agent, or Firm — Lessani Law Group, PC

(57) ABSTRACT

A system and method enable a designer to design an application using a design tool, deploy the application for execution, and subsequently view statistics related to the execution within the design tool. The designer uses the design tool to create an application flow for the application, and the design tool then generates software code for such application. In generating software code, the design tool inserts markers in the application code that demarks the boundaries between nodes in the application flow. When the application is executed, a log is created in accordance with the markers such that data is logged for nodes traversed during the execution of the application. Using the logged data, statistics are calculated for one or more of the nodes. These statistics are provided to the design tool and, in the preferred embodiment, displayed in conjunction with the application flow in the user interface of the design tool.

22 Claims, 8 Drawing Sheets

(56) References Cited

U.S. PATENT DOCUMENTS

| | | |
|---|---|---|
| 7,366,780 B2 | 4/2008 | Keller et al. |
| 7,401,087 B2 | 7/2008 | Copperman et al. |
| 7,487,095 B2 | 2/2009 | Hill et al. |
| 7,657,005 B2 | 2/2010 | Chang |
| 7,698,140 B2 | 4/2010 | Bhardwaj et al. |
| 7,724,878 B2 | 5/2010 | Timmins et al. |
| 7,779,408 B1 | 8/2010 | Papineau |
| 8,000,973 B2 | 8/2011 | Williams et al. |
| 8,370,362 B2 | 2/2013 | Szabo |
| 8,380,696 B1 | 2/2013 | Rogers et al. |
| 8,401,156 B1 | 3/2013 | Milro et al. |
| 8,589,373 B2 | 11/2013 | Mayer |
| 2001/0037241 A1 | 11/2001 | Puri |
| 2001/0039492 A1 | 11/2001 | Nemoto |
| 2001/0056359 A1 | 12/2001 | Abreu |
| 2002/0010000 A1 | 1/2002 | Chern et al. |
| 2002/0065736 A1 | 5/2002 | Wilner |
| 2002/0087323 A1 | 7/2002 | Thomas et al. |
| 2002/0169618 A1 | 11/2002 | Caspari |
| 2002/0177914 A1 | 11/2002 | Chase |
| 2003/0023439 A1 | 1/2003 | Ciurpita et al. |
| 2003/0162561 A1 | 8/2003 | Johnson et al. |
| 2003/0185359 A1 | 10/2003 | Moore et al. |
| 2003/0204404 A1* | 10/2003 | Weldon et al. .............. 704/270.1 |
| 2003/0204444 A1 | 10/2003 | Van Luchene et al. |
| 2003/0233224 A1 | 12/2003 | Marchisio et al. |
| 2004/0102225 A1 | 5/2004 | Furuta et al. |
| 2004/0107088 A1 | 6/2004 | Budzinski |
| 2004/0161097 A1 | 8/2004 | Henry |
| 2004/0162724 A1 | 8/2004 | Hill et al. |
| 2004/0252646 A1 | 12/2004 | Adhikari et al. |
| 2005/0114794 A1 | 5/2005 | Grimes et al. |
| 2005/0147052 A1 | 7/2005 | Wu |
| 2005/0183032 A1 | 8/2005 | Bushey et al. |
| 2006/0080107 A1 | 4/2006 | Hill et al. |
| 2006/0135215 A1 | 6/2006 | Chengalvarayan et al. |
| 2006/0155662 A1 | 7/2006 | Murakami et al. |
| 2006/0262919 A1 | 11/2006 | Danson et al. |
| 2007/0190983 A1 | 8/2007 | Goldfarb et al. |
| 2008/0010280 A1 | 1/2008 | Jan et al. |
| 2008/0084971 A1 | 4/2008 | Dhanakshirur |
| 2008/0088440 A1 | 4/2008 | Palushaj |
| 2008/0300870 A1 | 12/2008 | Hsu et al. |
| 2008/0304632 A1* | 12/2008 | Catlin et al. .............. 379/88.04 |
| 2009/0245493 A1 | 10/2009 | Chen et al. |
| 2009/0274068 A1 | 11/2009 | Kostner et al. |
| 2010/0122214 A1 | 5/2010 | Sengoku |
| 2010/0135470 A1 | 6/2010 | Bishop |
| 2010/0205180 A1 | 8/2010 | Cooper et al. |
| 2010/0267378 A1 | 10/2010 | Hamabe et al. |
| 2010/0312782 A1 | 12/2010 | Li et al. |
| 2010/0313157 A1* | 12/2010 | Carlsson et al. .............. 715/769 |
| 2011/0200181 A1 | 8/2011 | Issa et al. |
| 2011/0218983 A1 | 9/2011 | Chaney et al. |
| 2011/0238409 A1 | 9/2011 | Larcheveque et al. |
| 2011/0238410 A1 | 9/2011 | Larcheveque et al. |
| 2011/0276190 A1 | 11/2011 | Lillis et al. |
| 2013/0130661 A1 | 5/2013 | Berner et al. |
| 2013/0139111 A1 | 5/2013 | Grimes et al. |

* cited by examiner (Background Information)

SYSTEM AND METHOD FOR DISPLAYING KEY PERFORMANCE INDICATORS IN AN APPLICATION DESIGN TOOL

BACKGROUND OF THE INVENTION

1. Field of the Invention

This invention relates generally to software design tools and, more particularly to displaying key performance indicators for an executed application in a user interface of an application design tool.

2. Description of the Background Art

As shown in FIG. 1, the lifecycle of an application, especially those that engage in a dialog with a user (e.g., an interactive voice response (IVR) application) often includes phases in design, development, deployment (i.e., execution), and optimization, where optimization is based on performance data generated by application reporting systems. Although this lifecycle is considered a closed loop when there is an optimization recommendation that feeds back to the design process, there is not a set of tools that completely links the application reporting systems to the design tools. Specifically, current application reporting tools do not actively provide key performance indicators (KPIs) back to the software design tool. Consequently, there is a need for a system that is capable of providing KPI data back to the design tool such that an application designer can see high-level and detailed performance indicators within the design tool.

SUMMARY OF THE INVENTION

The present invention provides a system and method that closes the loop in the full application lifecycle by providing key performance indicators for an executed application back to the design phase. Specifically, the present invention enables an application designer/developer to design an application using a design tool, deploy the application for execution, and subsequently view statistics related to the execution within the design tool.

The application lifecycle begins with the designer creating an application flow for an application using an application design tool. The application flow represents the structure and flow of the application. The application flow includes a sequence of nodes that represents functions in the application.

After the design is complete, the design tool generates software code for the designed application. In generating software code, the design tool inserts markers in the application code that demarks the boundaries between nodes in the application flow of the designed application. When the application is executed, a log is created in accordance with the markers such that data is logged for nodes traversed during the execution of the application.

Using the logged data, execution-related statistics are calculated for one or more of the nodes. These statistics are provided to the design tool. The designer is then able to see statistics related to the performance of individual nodes within the design tool user interface (UI). The statistics are preferably displayed in conjunction with the application flow in the UI.

In one embodiment, the designer can elect to see performance statistics only for nodes that satisfy certain performance thresholds (e.g., "show nodes that resulted in a problem during at least 30% of the executions of such node"). In response to a designer entering threshold requirements, the design tool identifies nodes that satisfy such thresholds (based on the statistics) and displays statistical information in the UI for only such nodes. This enables designers to easily find nodes that could be improved through the design or other application specification modifications.

The present invention can be used to design and optimize a variety of different applications, including, but not limited to IVR applications, web applications, mobile phone applications, and multi-modal communication applications.

BRIEF DESCRIPTION OF THE DRAWINGS

FIG. 1 is background information.

DETAILED DESCRIPTION OF THE PREFERRED EMBODIMENTS

Figure 1:
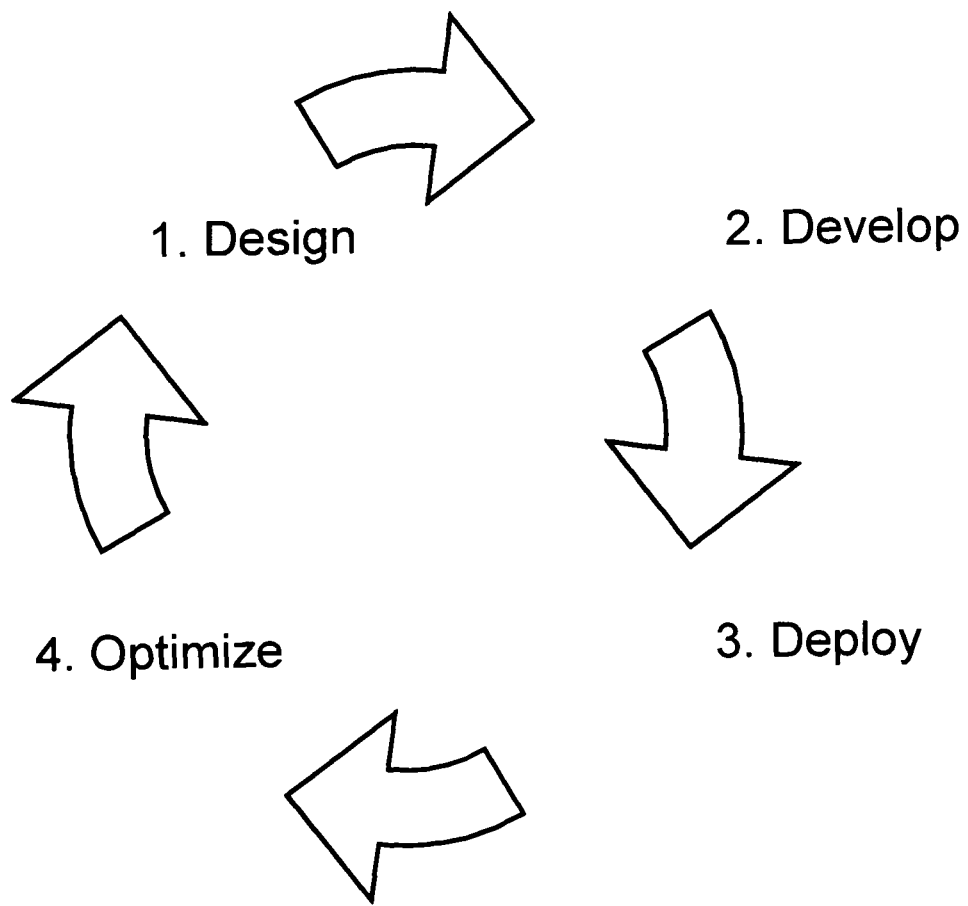
FIG. 1 is illustrates the typical lifecycle of certain types of applications, such as a customer service application (e.g., an IVR application).
Figure 2:
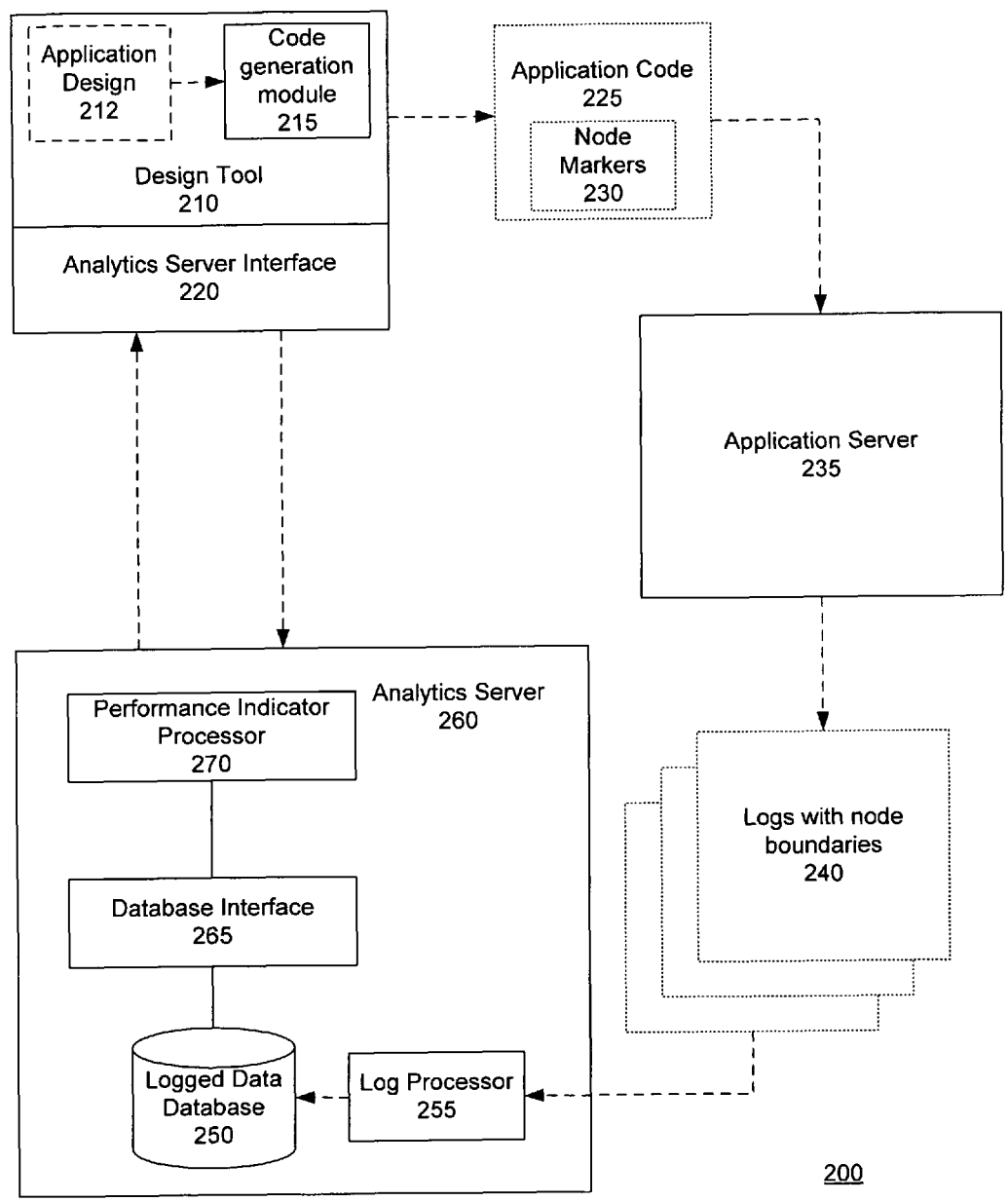
FIG. 2 is a block diagram of an example system in which the present invention can be implemented

FIG. 2 illustrates an example system in which the present invention may be implemented. FIG. 2 is only an example and those skilled in the art will appreciate that the methods described with respect to FIGS. 3-5 can be implemented by other types of systems.

The system 200 includes a Design Tool 210 that provides an interface via which a user can graphically design an application, such as an IVR application, a web application, a mobile phone application, or a multi-modal communication application. The Design Tool runs on either a server or a stand-alone computer. The Design Tool 210 includes a Code Generation Module 215 that generates application code 225 based on the application design 212. As will be discussed in more detail with respect to FIG. 3, the application code includes node markers 230.

The application code is deployed and executed on an Application Server 235, which represents one server or a network of servers. In executing the application code 225, the Application Server 235 logs data associated with the execution of the application. The logs 240 are stored in Database 250 by Analytics Server 260.

Analytics Server 260 processes the logged data to generate performance indicator values or other statistics related to the execution of the application code 225. The Analytics Server 260 includes (i) a Log Processor 255 that preprocesses logged data before it stores the data in Database 250, (ii) a Database Interface 265 that retrieves data from Database 250, and (iii) a Performance Indicator Processor 270 that processes statistics requested by the Design Tool 210. The Analytics Server 260 also may include one or more additional modules (not shown) related to rendering other reports based on the logged data (i.e., reports not requested by the Design Tool), but such modules are not relevant to the present invention. Execution-related statistics are requested by the Design Tool 210 via an Analytics Server Interface 220.

Figure 3:
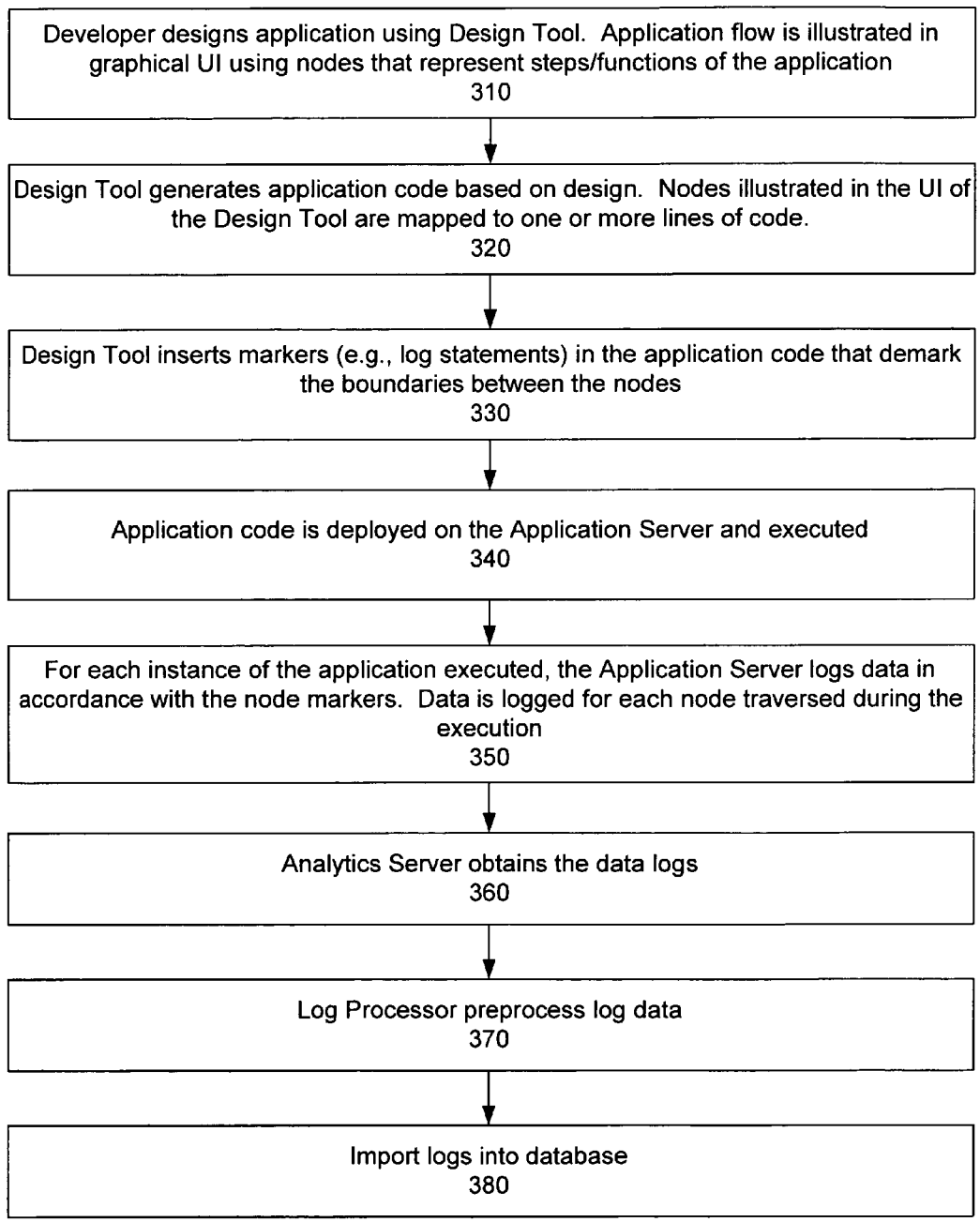
FIGS. 3-5 are flowcharts that illustrate a method according to one embodiment of the present invention.
Figure 4:
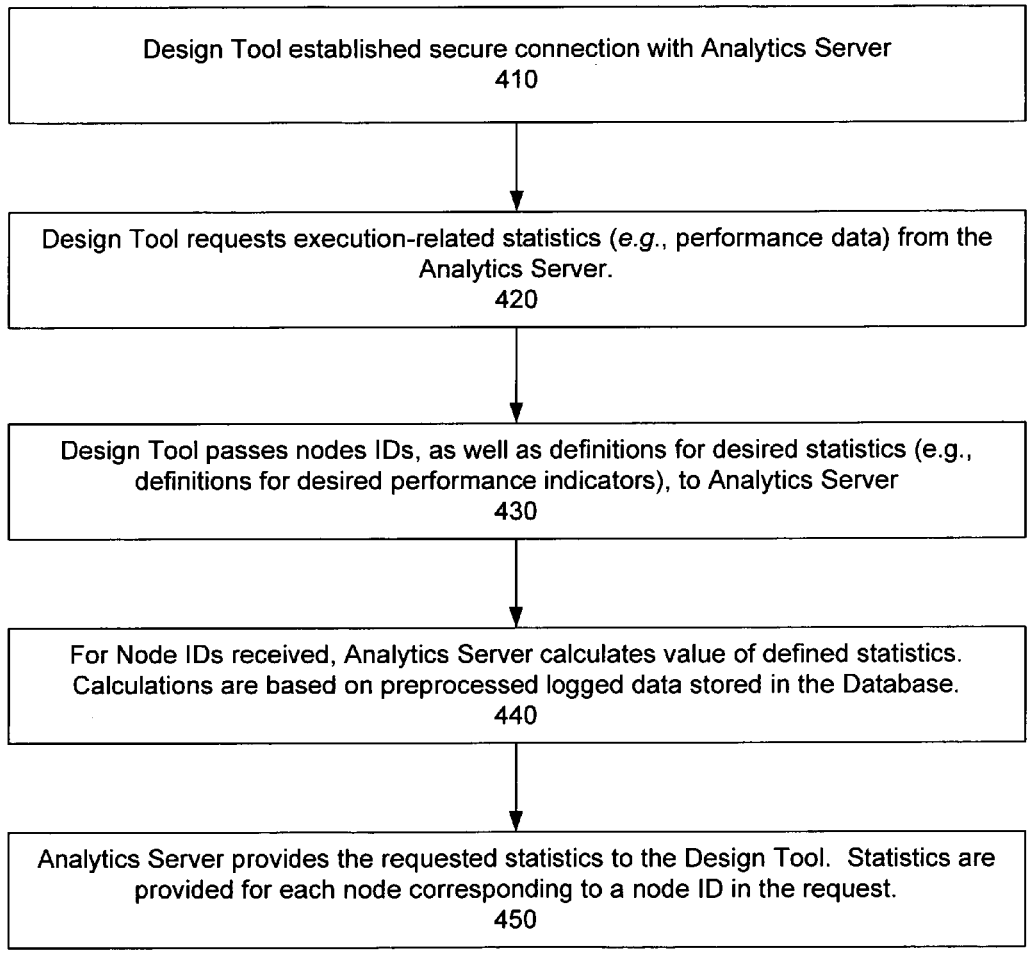
Figure 5:
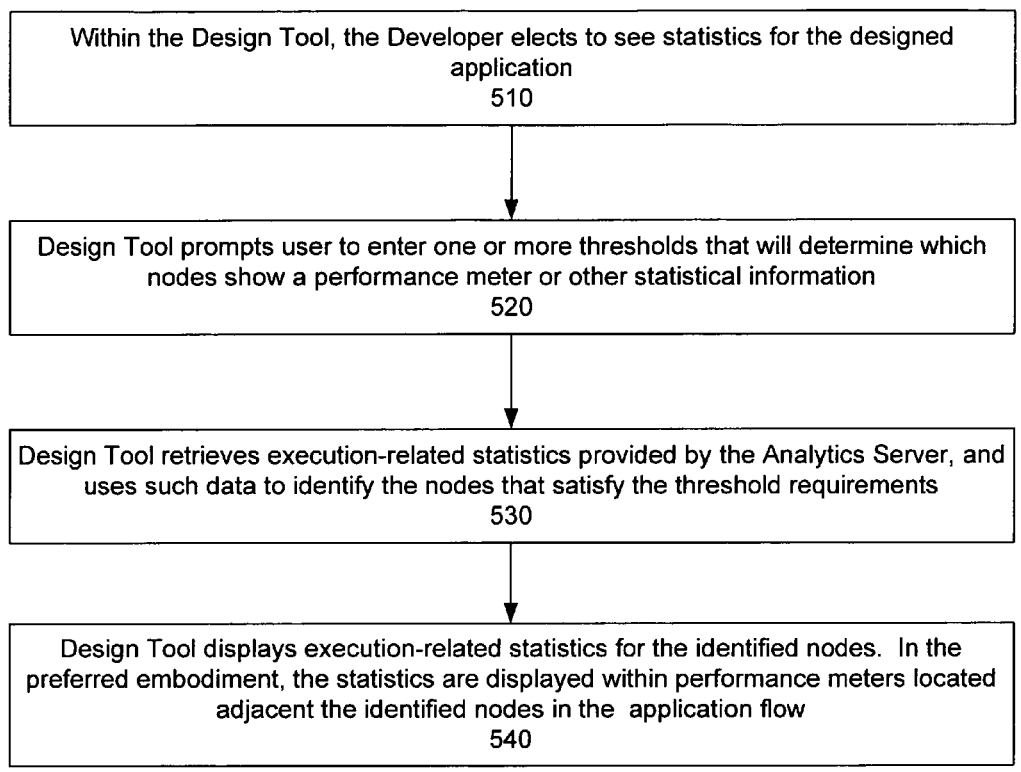

FIGS. 3-5 collectively illustrate a method, covering the full application lifecycle, for providing execution-related statistics for an executed application back to the design phase. FIG. 3 illustrates the design and execution phases. FIG. 4 illustrates a method for calculating and providing execution-related statistics to a design tool. FIG. 5 illustrates a method for displaying execution-related statistics in an application flow within the design user interface. For example purposes, the methods illustrated in FIGS. 3-5 are discussed with respect to the system illustrated in FIG. 2, but, as stated above, the methods illustrated in FIGS. 3-5 are not limited to the system illustrated in FIG. 2. In the preferred embodiment, the methods illustrated in FIGS. 3-5 are implemented in software.

Figure 6A:
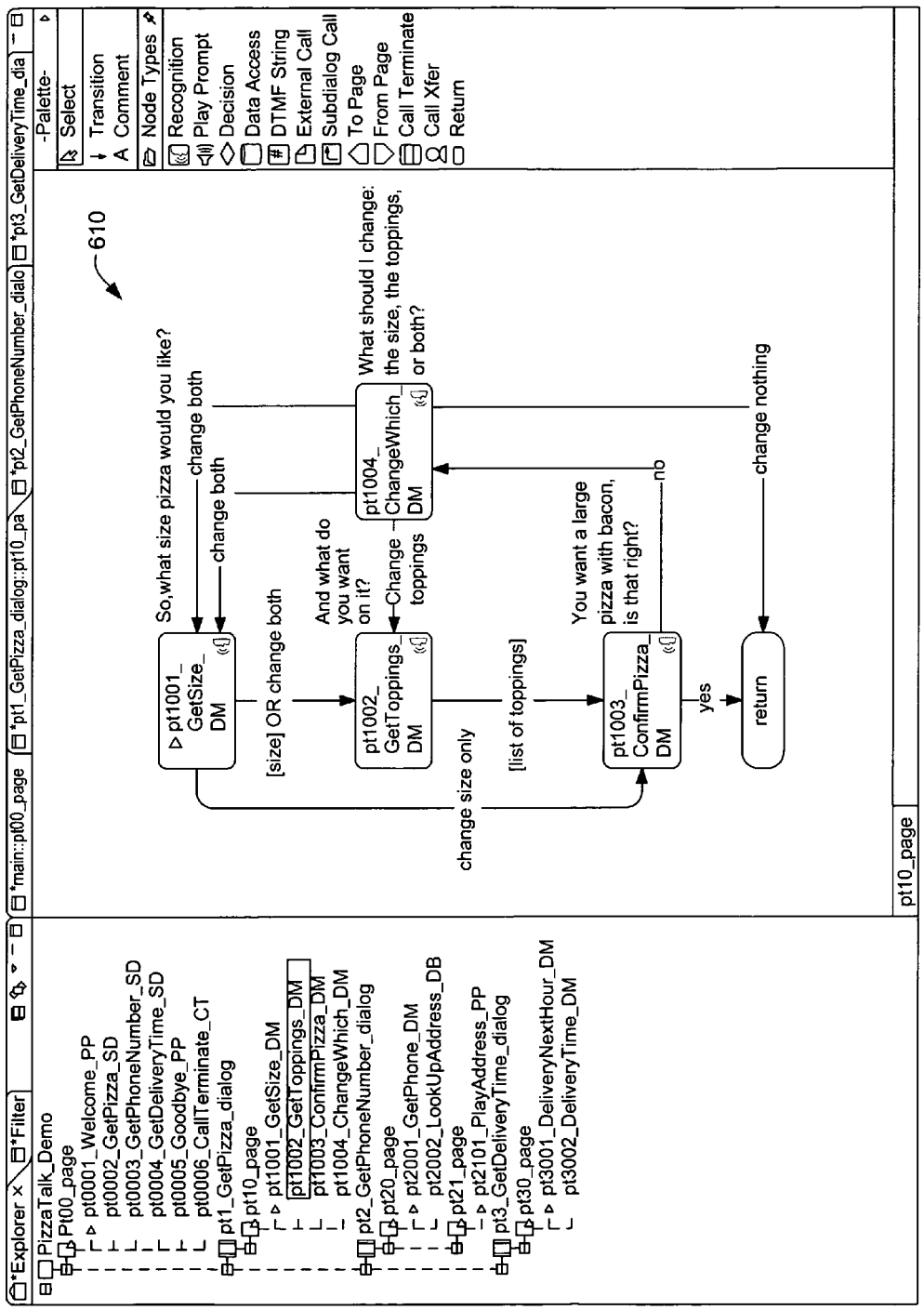
FIGS. 6a-6c are screen shots that illustrate an application flow in a design tool UI.

Referring to FIG. 3, the application lifecycle begins when a designer designs an application using the Design Tool 210 (step 310). In designing the application, the designer creates a graphical application flow that represents the structure and flow of the application. The application flow is a primary design deliverable that contains a wealth of information about the application. The application flow includes a sequence of nodes that represents functions in the application. An example of a function in a customer service application is a "user interaction," wherein the application prompts the user for input and waits for the input. Another example of an "interaction" is playing a prompt to a user in an IVR application. FIG. 6a illustrates an example of an application flow 610 displayed in the UI of a design tool.

After the designer completes the design, the Code Generation Module 215 of the Design Tool 210 generates application code for the designed application (step 320). In generating the application code, the Code Generation Module 215 maps nodes illustrated in the application flow to one or more lines of code. After the Code Generation Module 215 has identified the lines of code corresponding to each node in the application flow, the Code Generation Module 215 inserts markers in the application code that demark the boundaries between nodes and that indicate the type of information that will be logged for each node (step 330). In one embodiment, the markers are in the form of log statements.

The application code is then deployed on the Application Server 235 and executed (step 340). For each instance of the application executed, the Application Server 235 logs data in accordance with the node markers/log statements (step 350). Consequently, data is logged for each design node (i.e., application flow node) traversed during the execution.

The Analytics Server 260 obtains the data logs from the Application Server 235 (step 360). In one embodiment, the Analytics Server uses a scheduling mechanism to periodically (e.g., once a day) retrieve data logs from the Application Server 235, which may be a single server or a group of servers. The Log Processor 255 on the Analytics Server 260 "preprocesses" the data (i.e., it does some preliminary processing) (step 370) before it is stored in Database 250 (step 380).

Below is an example of log statements for a node:
EVNT=UIndst|NAME=node_name
[ . . . node specific log details]
EVNT=UIndnd|NAME=node_name|RSLT=node_result|INFO=result_info Below are examples of logged events for an IVR application. In these examples, the start of an execution of a design node is logged as a "UIndst" event, and the end of the execution of a node is logged as a "UIndnd" event (in accordance with the example log statements above).

1. TIME=20091105152611644|EVNT=UIndst|NAME=pt0001_Welcome_PP

The above is an example of a logged node start. The NAME attribute is the name of the design node that is starting. If the node starting is a decision node, then a decision node event is logged (e.g., EVENT="SWIdsst")

2. TIME=20091105152611722|EVNT=UIndnd|NAME=pt0001_Welcome_PP|RSLT=undefined|INFO=undefined The above is an example of a logged node end. The NAME attribute is the name of the design node being exited. In the example, values for the attribute "RLST" and "INFO" are logged. The value of the "RLST" attribute represents the result of the node. It may be derived from the last service call in the node. In an IVR application, examples of the value of such an attribute include "undefined," "success," "agent," and "hang up". In this example, the result is "undefined" because the node is a "play prompt" node. The value of the "INFO" attribute represents more information related to the result of the node.

3. TIME=20091125110819048|EVNT=UIndnd|NAME=pt1001_GetSize_DM|RSLT=SUCCESS|INFO=LARGE The above is an example of the log of the end of a user dialog node in an IVR system. In this case, RLST=SUCCESS, meaning the node was able to successfully receive and recognize valid input from the user. In this case, the information obtained is that user wanted a "large" size of an item (i.e., a pizza).

4. TIME=20091125110819048|EVNT=UIndnd|NAME=pt1001_GetSize_DM|RSLT=FAILURE|INFO=collection_maxnomatch In the above example, the IVR system was unable to match the user's input to a valid entry, and this instance of the node is logged as a failure.

5. TIME=20091125110819048|EVNT=UIndnd|NAME=pt1001_GetSize_DM|RSLT=COMMAND|INFO=operator The above log indicates the user exited out of the node by stating the command "operator."

6. TIME=20091105154358279|EVNT=UIreturn|NAME=pt0002_GetPizza_SD

If a node includes a subdialog call, then the return from a subdialog can be logged. The above log indicates a return from a subdialog. In this example, a return from a subdialog is logged as a "UIreturn" event. The NAME attribute is not the subdialog, but, rather it is the name of the node that called the subdialog.

Referring to FIG. 4, a designer can establish a secure connection with the Analytics Server 260 via the Design Tool 210 (step 410). In one embodiment, the designer provides the Analytics Server 260 name, port, and protocol, as well as the customer name associated with application (as represented in the Database 250), repository, username, and password.

Once the Design Tool establishes a secure connection with the Analytics Server 260, the Design Tool can then fetch data from the Analytics Server 260. To do so, the Design Tool 210 requests execution-related statistics (e.g., performance data) for an application from the Analytics Server 260 (step 420). The request includes the node IDs associated with the application (step 430). In the preferred embodiment, the request also includes definitions for the statistics desired (e.g., definitions for desired key performance indicators). This enables designers to define key performance indicators and other statistics after a designed application is compiled and execution-related data is logged (i.e., an "after-the-fact" definition). The variables in the definitions are attributes logged during the execution process, but the way the attributes are used in a definition can be determined subsequent to the logging. Below is an example of an after-the-fact task definition of "success" and "failure" for a node named "Welcome" that uses the "RLST" and INFO" attributes discussed above:

```
<task name="Welcome" version="1.0" limit="ALL">
<start>
  <stateGroupList>
    <stateGroup>
      <state name="UIndst">
```

-continued

```
            <expression><![CDATA[(NAME = Welcome)]]>
            </expression>
         </state>
      </stateGroup>
   </stateGroupList>
</start>
<success>
   <stateList>
      <state name="Ulndnd">
         <expression><![CDATA[((NAME=Welcome) & (RSLT ~
"(?i)(undefined|SUCCESS|0|SUCC|UNKN)"))]]>
         </expression>
         <label>success</label>
      </state>
      <state name="Ulndn">
         <expression><![CDATA[((NAME="Welcome") & ((RSLT =
"COMMAND") & !(INFO ~ "(?i)(operator|representative|
agent)")))]]>
         </expression>
         <label><![CDATA[=INFO]]></label>
      </state>
   </stateList>
</success>
<failure>
   <stateList>
      <state name="Ulndnd">
         <expression><![CDATA[((NAME= "Welcome") & (((RSLT =
"COMMAND") & (INFO ~ "(?i)(operator|representative|agent)")) |
!(RSLT ~ "(?i)(unclefined|SUCCESS|0|COMMAND|
SUCC|UNKN)")))]]></expression>
         <label><![CDATA[=INFO]]></label>
      </state>
   </stateList>
</failure>
</task>
```

In an alternate embodiment, the request can include predefined statistics known to the Analytics Server 260.

In response to receiving the request from the Design Tool, the Analytics Server 260 calculates the statistics defined in the request for each of the nodes identified in the request (step 440). Calculations are based on the preprocessed logged data stored in the Database 250. The request may restrict the logged data used in the calculations to a certain set of parameters, such as a specified date range, a specified number of calls, etc. In the preferred embodiment, the Analytics Server 260 has a processor dedicated to calculating statistics requested by the Design Tool 210. In the system illustrated in FIG. 2, such processor is the Performance Indicator Processor 270.

After the calculations are complete, the Analytics Server 260 provides the requested execution-related statistics for the designed application back to the Design Tool 210 (step 450). Statistics are provided for each node ID listed in the request. In the preferred embodiment, the Analytics Server 260 provides the statistics within a structured XML document, wherein separate statistics are provided for each node. The XML document is a representation of raw data and compiled statistics. Preferably, the Design Tool 210 persistently stores the statistics so that the Design Tool 210 only needs to download such statistics from Analytics Server 260 once (until new or updated statistics are desired).

The designer can now elect to see the execution-related statistics within the UI of the Design Tool 210. In the preferred embodiment, the designer can elect to see statistics within the display of the application flow in the UI. In response to the designer indicating that he/she would like to see the execution-related statistics (step 510), the Design Tool 210 prompts the user to enter one or more thresholds that determine for which nodes statistics will be displayed (step 520). Examples of threshold requirements for an IVR application are:

Show execution-related statistics for nodes that have call traffic greater than a specified percentage.

Show execution-related statistics for nodes that resulted in a hang up greater or equal to a specified percentage of executions of the node (e.g., show statistics for nodes that resulted in a hang-up at least 30% of the time).

Show execution-related statistics for nodes that resulted in an error greater than or equal to a specified percentage of executions of the node.

Show execution-related statistics for nodes that resulted in an agent request greater than or equal to a specified percentage of executions of the nodes.

Figure 6B:
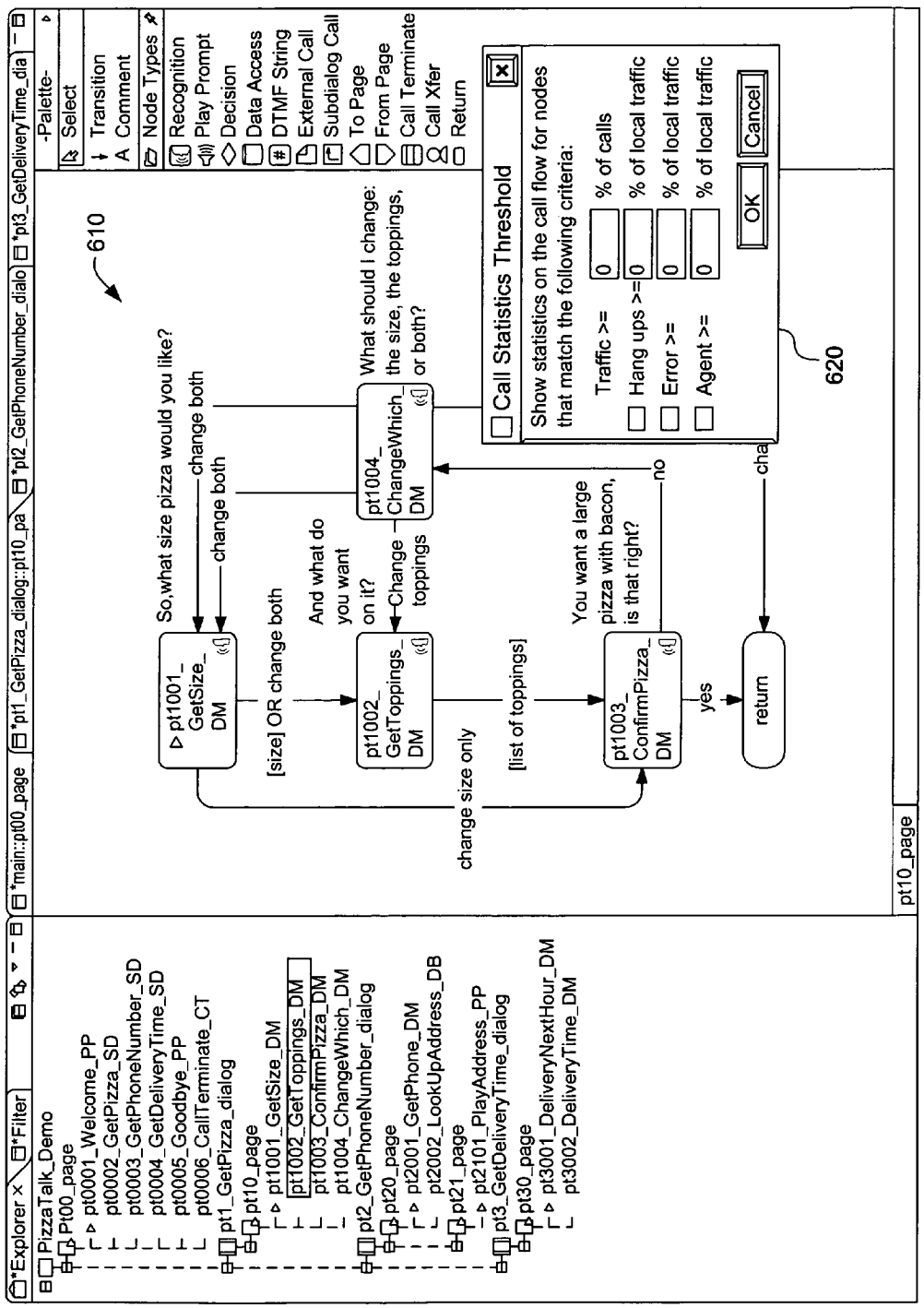

FIG. 6b illustrates pop-up window 620 via which a user can enter values for the above-described threshold requirements.

In response to the user entering the thresholds, the Design Tool 210 retrieves the execution-related statistics provided by the Analytics Server 260, and uses such data to identify the nodes in the application flow that satisfy the threshold requirements (step 530). The Design Tool 210 then displays execution-related statistical information for the identified nodes, preferably adjacent the nodes in the display of the application flow (step 540).

Showing performance data and/or other execution-related statistical information for only select nodes (i.e., those nodes associated with statistics that meet the threshold requirements) makes it easier for a designer to easily identify the nodes that could be improved through design or other application specification modifications. However, in an alternate embodiment, performance data and/or other statistics are displayed for all nodes.

Figure 6C:
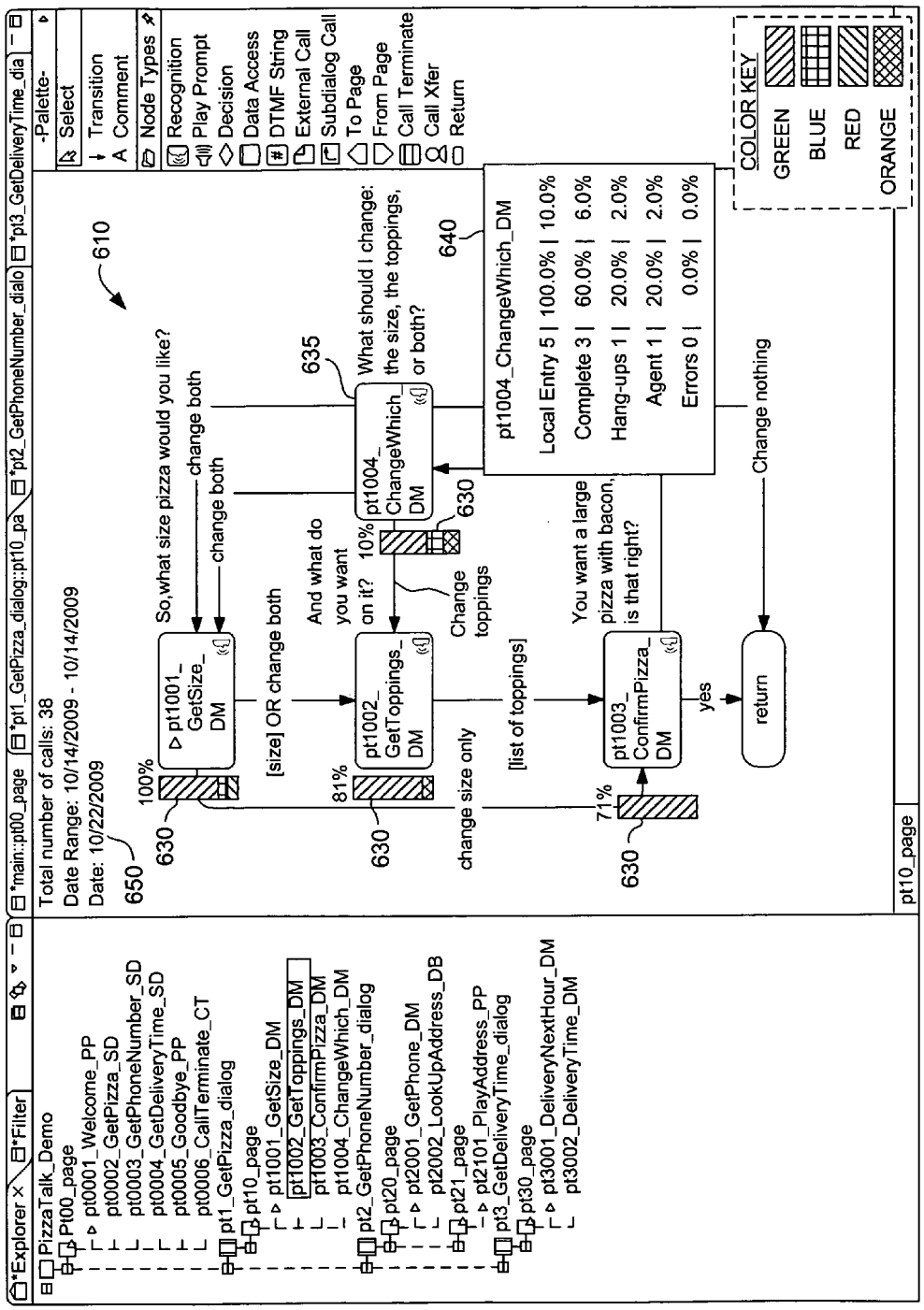

In the preferred embodiment, the statistics are reflected in performance meters, such as the performance meters 630 illustrated in FIG. 6c. In FIG. 6c, the performance meters 630 are color coded, wherein the different patterns within the meters represent different colors (see the key at the bottom of FIG. 6c). In this example, green is used to represent the relative percentage of node executions that completed successfully, blue is used to represent the relative percentage of node executions that ended in a hang up, orange is used to show the relative percentage of node executions that ended in an agent request, and red is used show the relative percentage of node executions that ended in error. At the top of each meter 630 is the percentage of calls that entered the node corresponding to the meter. In FIG. 6c, performance meters 630 are displayed besides each node because in window 620 in FIG. 6b, zero was entered for all the thresholds.

In one embodiment, the user can mouse over a performance meter to see additional information (e.g., additional execution-related statistics) related to the performance of the node. Examples of such additional information include:

The raw number of executions that fall into each of the metrics displayed in the performance meter The relative percentage of node executions for each metric (for a total of 100% of local entries)

The percentage of node executions for each metric as the percentage of all calls. This indicates the impact on overall call volume.

Table 640 illustrates an example of additional information displayed for a node 635 when a user mouses over the performance meter. Specifically, Table 640 shows the total number of calls that entered node 635, the number/percentage that completed successfully, the number/percentage which had a hang up, and the number/percentage that resulted in a live agent request, and the number/percentage of errors. The middle column is the percentages for calls that entered the node, and the right column is the percentages based on all calls in the system. The left column is the number of calls received at the node that are associated with the threshold condition.

When the user elects to see node statics, the Design Tool 210 may illustrate general information related to the statistics in the Design Tool 210 UI. In FIG. 6c, at the top of the application flow UI is a tag 650 that indicates the number of calls in the data set, the date range of the data gathered, and the date that the data was imported into the Design Tool 210.

The display of the performance meters/statistics can be toggled on and off as desired by the designer. In one embodiment, a designer can also generate an application flow specification that includes the performance meters so that key performance data can be presented to clients.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for displaying key statistics for a designed application in a user interface for an application design tool, the method comprising:
    providing a graphical user interface for a design tool via which a designer can design an application, wherein the design tool enables a designer to graphically create an application flow using a sequence of nodes that represent functions in the application;
    receiving an application design from a designer that is designed using the design tool;
    generating application code for the designed application, wherein generating the application code includes inserting a set of markers in the application code that demarks boundaries between nodes in the designed application;
    executing the application, wherein, for each instance of the application executed, a log is created in accordance with the markers such that data is logged for nodes traversed during the execution of the application;
    calculating statistics, based on the logged data, for one or more of the nodes;
    displaying the nodes in the graphical user interface to display the application flow;
    prompting the designer to enter threshold values for one or more statistics;
    identifying the nodes associated with statistics that satisfy the threshold requirements; and
    displaying statistical information, based on the calculated statistics, for only nodes associated with statistics that satisfy one or more threshold requirements, wherein the statistical information comprises at least one of (i) traffic at the node being greater than or equal to a specified amount or percentage of total traffic, (ii) disconnects at the node being greater than or equal to a specified amount or percentage of executions of the node, (iii) errors at the node being greater than or equal to a specified amount or percentage of executions of the node, and (iv) agent requests at the node being greater than or equal to a specified amount or percentage of executions of the node, and wherein nodes associated with statistics that do not satisfy the one or more threshold requirements are displayed without statistical information.

2. The method of claim 1, wherein the statistical information for an identified node is displayed adjacent the identified node in the user interface of the design tool.

3. The method of claim 1, wherein the statistical information for a node is displayed adjacent the node within a display of the application flow.

4. The method of claim 3, wherein the statistical information is displayed as a color-coded meter.

5. The method of claim 4, wherein, when the designer mouses over a meter for a node, additional information related to the node is displayed.

6. The method of claim 1, wherein the designed application is a voice application for an interactive voice response system.

7. The method of claim 1, wherein the designed application is a web application.

8. The method of claim 1, wherein the designed application is an application for a mobile phone.

9. The method of claim 1, wherein the designed application is an application for a multi-modal communication application.

10. The method of claim 1, wherein inserting the markers includes mapping each of the nodes illustrated in the graphical user interface of the design tool to one or more lines of application code.

11. A system for displaying statistics for an application within an application design tool, the system comprising:
    a design software tool running on a computer that (i) enables a designer to graphically create an application flow using a sequence of nodes that represent functions in the application, and (ii) in response to the designer inputting a design, generates application code based on the design, including inserting markers in the application code that demark boundaries between nodes in the designed application;
    an execution server that executes the application code, wherein, for each instance of the application executed, the execution server creates a log in accordance with the markers such that data is logged for nodes traversed during the execution of such instance of the application;
    a database operatively coupled to the execution server for storing the logged data; and
    an analytics server that (i) obtains the logged data from the database, (ii) calculates statistics for one or more of the nodes using the logged data and (iii) provides such values to the design software tool,
    wherein the design software tool subsequently displays the nodes in a graphical user interface to display the application flow, prompts the designer to enter threshold values for one or more statistics, identifies the nodes associated with statistics that satisfy the threshold requirements, and displays statistical information, based on the calculated statistics, for only nodes associated with statistics that satisfy one or more threshold requirements, wherein the statistical information comprises at least one of (i) traffic at the node being greater than or equal to a specified amount or percentage of total traffic, (ii) disconnects at the node being greater than or equal to a specified amount or percentage of executions of the node, (iii) errors at the node being greater than or equal to a specified amount or percentage of executions of the node, and (iv) agent requests at the node being greater than or equal to a specified amount or percentage of executions of the node, and wherein nodes associated with statistics that do not satisfy the one or more threshold requirements are displayed without statistical information.

12. The system of claim 11, wherein the analytic server calculates the statistics in response to a request from the design software tool.

13. The system of claim 12, wherein the request includes definitions for the requested statistic, and the analytics server calculates the values of the statistics in accordance with such definitions.

14. The system of claim 13, wherein each node in the designed application is associated with a unique ID and the request also includes node IDs.

15. The system of claim 14, wherein the analytics server provides the calculated statistics to the design software tool in a structured XML document form.

16. The system of claim 14, wherein the statistical information for an identified node is displayed adjacent the identified node.

17. The system of claim 16, wherein the statistical information is displayed as a color-coded meter.

18. The system of claim 11, wherein the designed application is a voice application for an interactive voice response system.

19. The system of claim 11, wherein the designed application is a web application.

20. The system of claim 11, wherein the designed application is an application for a mobile phone.

21. The system of claim 11, wherein the designed application is an application for a multi-modal communication application.

22. A computer program embodied on one or more non-transitory computer-readable media and comprising code that when executed by a computer system, enables the computer system to perform the following method for displaying key statistics for a designed application in a user interface for an application design tool, the method comprising:

provanding a graphical user interface for a design tool via which a designer can design an application, wherein the design tool enables a designer to graphically create an application flow using a sequence of nodes that represent functions in the application;

receiving an application design from a designer that is designed using the design tool;

generating application code for the designed application, wherein generating the application code includes inserting a set of markers in the application code that demarks boundaries between nodes in the designed application;

for each instance of the application executed, creating a log in accordance with the markers such that data is logged for nodes traversed during the execution of the application;

calculating statistics, based on the logged data, for one or more of the nodes;

displaying the nodes in the graphical user interface to display the application flow;

prompting the designer to enter threshold values for one or more statistics;

identifying the nodes associated with statistics that satisfy the threshold requirements; and displaying statistical information, based on the calculated statistics, for only nodes associated with statistics that satisfy one or more threshold requirements, wherein the statistical information comprises at least one of (i) traffic at the node being greater than or equal to a specified amount or percentage of total traffic, (ii) disconnects at the node being greater than or equal to a specified amount or percentage of executions of the node, (iii) errors at the node being greater than or equal to a specified amount or percentage of executions of the node, and (iv) agent requests at the node being greater than or equal to a specified amount or percentage of executions of the node, and wherein nodes associated with statistics that do not satisfy the one or more threshold requirements are displayed without statistical information.

\* \* \* \* \*